United States Patent [19]

Hagiwara et al.

[11] Patent Number: 4,627,878

[45] Date of Patent: Dec. 9, 1986

[54] METHOD OF PRODUCING POROUS MAGNESIA CLINKER

[75] Inventors: Hiroshi Hagiwara, Urawa; Masaru Shirasaka, Tokyo; Tsunenori Moriyama, Nagasaki, all of Japan

[73] Assignees: Onoda Cement Co., Ltd., Yamaguchi; Omura Refractories Co., Ltd., Nagasaki, both of Japan

[21] Appl. No.: 599,068

[22] Filed: Apr. 11, 1984

[30] Foreign Application Priority Data

Apr. 14, 1983 [JP]  Japan ................................. 58-64591

[51] Int. Cl.$^4$ ............................................. C04B 3/00
[52] U.S. Cl. ...................................... 106/121; 106/86; 501/81; 501/101; 501/109
[58] Field of Search .................... 106/86, 121; 501/81, 501/109, 101

[56] References Cited

U.S. PATENT DOCUMENTS

| | | | |
|---|---|---|---|
| 2,360,929 | 10/1944 | Blaha | 501/81 X |
| 2,702,748 | 2/1955 | Heine | 501/82 |
| 3,378,382 | 4/1968 | Burkett | 501/83 |
| 4,229,221 | 10/1980 | Uemura et al. | 501/108 |

FOREIGN PATENT DOCUMENTS 2141702  1/1985  United Kingdom ................ 501/109

*Primary Examiner*—William R. Dixon, Jr.
*Assistant Examiner*—Ann Knab

[57] ABSTRACT

A method for producing a porous magnesia clinker by admixing a magnesia material having a grain size of less than 0.1 mm with from 10 to 60 percent by weight of the mixture of fluid oil coke having a grain size of 1 mm or less, calcining the resulting mixture at a temperature of from 900° to 1600° C. for a time sufficient to burn off the coke and thereby to form pores in the magnesia material, and firing the resulting product at a temperature of from 1600° C. to 2030° C. to produce porous magnesia clinker.

2 Claims, No Drawings

METHOD OF PRODUCING POROUS MAGNESIA CLINKER

BACKGROUND OF THE INVENTION

The present invention is related to a method of manufacturing porous magnesia clinkers which are light in weight and have a high heat insulating property and an excellent product strength.

Basic refractory materials made mainly of magnesia clinkers are generally used as an essential lining material in most of the industrial kilns in the fields of steel making and the ceramic industry. This is because magnesia clinkers have excellent properties as basic refractory material; they have a high melting point of 2,800° C., a low tendency for slaking because of their comparatively high chemical inertness, and a corrosion resistance against basic slug which is remarkably higher than that of the other materials such as alumina and mullite. However, they are defective in that their heat conductivity is high. If magnesia clinkers could be made porous, the heat conductivity can be reduced.

There have been known in the prior art following manufacturing methods for porous magnesia clinkers:

(i) A method of adding sawdust, polystyrene, etc. to the raw material, forming and firing the same.
(ii) A method of adding foam in magnesia powder slurry before drying and firing.
(iii) A method of adding Al powder or acetic acid in magnesia powder slurry before forming and firing.
(iv) A method of electrically melting magnesia clinkers and blowing compressed air to obtain bubbles.

However, all of the above mentioned methods are defective in that the strength of formed products or calcined products are extremely low. Further, the fields of application is extremely limited for the products prepared by the method (iv) as electrical melting method results in a remarkably high product cost.

SUMMARY OF THE INVENTION

The present invention aims at offering a manufacturing method of porous magnesia clinkers which have high porosity, have pores uniform in size and distribution, an excellent heat insulation and a high product strength.

In order to achieve the above aim, the present invention is characterized by the steps of adding oil cokes to magnesia material, forming the resultant mixture, calcining the same to burn oil cokes to form pores, and firing. The present invention is further characterized in that the oil cokes used in the method are fluid oil cokes, the grain size of magnesia is 0.1 mm or less and that of oil cokes is 3 mm or less, the calcination temperature is in the range of 900° C. to 1,600° C., and the firing temperature is in the range of from about 1,600° C. to 2,030° C.

DETAILED DESCRIPTION OF THE INVENTION

Magnesia clinker is generally produced by firing magnesia materials such as magnesite $MgCO_3$, magnesium hydroxide $Mg(OH)_2$, etc. at a high temperature of over 1,600° C.

Ordinary raw materials of magnesia such as calcined magnesia MgO, magnesite $MgCO_3$, magnesium hydroxide $Mg(OH)_2$ or the mixtures thereof may be employed in the present invention. Powdered calcined magnesia which is widely used as raw material for magnesia clinker may be used, but their grain size should preferably be 0.1 mm or less.

In the present invention, oil coke is added to said magnesia material to form mixture and then calcined to burn out said oil coke in calcined products to form pores, the calcined products are fired to obtain porous clinker.

The oil cokes employed in the present invention are obtained by thermally cracking asphalt and pitch which are residuals in oil refining process and distillating the cracked oil. Compared with coal or coal coke, the resultant oil coke has a smaller ash content and a greater fixed carbon content which is as high as ca. 90%.

Fluid oil coke has a particularly high carbon content of about 95%, 90% of which has the grain size of 0.1–0.4 mm and a substantially spherical configuration.

All these advantageous properties of oil coke enable uniform dispersion of the coke when mixed with magnesia material, and formation of minute pores with equal diameter when burned out.

Experimental example 1 shows the differences between oil coke and other combustible substances.

EXPERIMENTAL EXAMPLE 1

Fluid oil coke, delayed oil coke and anthracite of the grain size of 1 mm or less were added at the ratio of 40% by weight to calcined magnesia (Ig. loss of 2.5%, MgO 96.0%, CaO 0.95%, $SiO_2$ 0.20%, $Al_2O_3$ 0.05%, $Fe_2O_3$ 0.05%, 0% residue on the 44$\mu$ sieve) and mixed together. The resultant mixture was pressed by a briquet machine at the ratio of 20% of water to form briquets of 20×25×25 mm shaped like almond. On the other hand, sawdust is added at the ratio of 20% by weight to calcined magnesia and pressed at the ratio of 35% of water to same briquets in size of above mixture. However said formed briquets did not have good forming property because of the high restorative property of sawdust after pressing.

The formed products were air-dried, piled in an iron vessel (ca. 0.5 m$^3$) lined with castable refractories and calcined at 1,300° C. with controlled air flow. The calcined materials were taken out and charged into a rotary kiln and fired at 1,900° C. Grain size distribution of the added coke and sawdust and the strength of formed products are shown in Table 1. The properties of the calcined materials and the fired product in the rotary kiln are shown in Table 2.

TABLE 1

| | grain size of admixture (%) | | | |
|---|---|---|---|---|
| admixture | 1.0–0.42 mm | 0.42–0.105 mm | 0.105 or less mm | briquet strength |
| fluid oil coke | 1.5 | 93.4 | 5.1 | good |
| delayed oil coke | 51.7 | 31.5 | 16.6 | good |
| anthracite | 50.5 | 32.0 | 17.5 | good |
| sawdust | 70.3 | 28.5 | 1.0 | poor no desired briquets were obtained |

TABLE 2

| | condition | properties of fired products | | |
|---|---|---|---|---|
| admixture | of calcined products | pore shape | pore-distribution ($\mu$) | porosity (%) | yield (%) |
| fluid oil | good | spherical | 50–200 | 48.7 | 93 |

TABLE 2-continued

| admixture | condition of calcined products | properties of fired products | | | |
|---|---|---|---|---|---|
| | | pore shape | pore-distribution ($\mu$) | porosity (%) | yield (%) |
| coke delayed oil coke | good | irregular | 5–500 | 34.1 | 88 |
| anthracite | good | irregular | 5–500 | 33.2 | 87 |
| sawdust | poor | collapsed when charged into a rotary kiln | | | |

Fluid oil coke of the size less than 1 mm were obtained by using a sieve. Delayed oil coke and anthracite were prepared by screening the pulverized powder.

It is noted from Tables 1 and 2 that porous magnesia clinker which has a high product strength, and a larger porosity and yield in the fired product is industrially produced at least cost by the steps of adding oil coke to magnesia material, forming the mixture, calcining the same to burn out the oil coke and firing the same in a rotary kiln. When fluid oil coke powder is added, required amount is less compared to other coke powders and the pores which are to be contained in clinkers are spherical in shape and uniform in distribution.

This may be attributable to the fact that grain size of fluid oil coke is mostly in the range of approximately 0.1–0.5 mm and the shape thereof is spherical as shown in Table 1.

As described in the foregoing, oil coke is added to magnesia material in the present invention process. Fluid oil coke is preferable for the grain size and shape thereof.

The preferable amount of the fluid oil coke is the range of 10 to 60 weight % in the present invention. If the amount is less than 10%, porosity of the fired product becomes small to lower heat insulation. Strength of the formed and fired products becomes less when the amount exceeds 60%. This is not preferable since the loss due to the damage of products during the calcination and firing processes becomes larger.

The effect of different amounts of added fluid oil coke is shown in Experimental Example 2.

EXPERIMENTAL EXAMPLE 2

Five types of mixtures were prepared by adding and mixing the fluid oil coke powder used in Experimental Example 1 in the ratio of from 5 to 70 weight % to the raw material powder obtained by pulverizing magnesia clinker (MgO 95.0%, CaO 1.0%, $SiO_2$ 2.7%, $Fe_2O_3$ 0.3%, $Al_2O_3$ 0.6%) to the grain size of 3.2% residue on the 44$\mu$ sieve. Water was added to each mixture in the ratio of 10%, and the mixture was pressed by a briquet machine to obtain briquets of 20×25×25 mm. After air-drying at 110° C., the briquets were calcined to burn out the fluid oil coke at 1400° C. in an iron vessel lined with castable refractories used in Experimental Example 1 with the controlled airflow. The calcined products were fed into a rotary kiln and fired at 1,900° C. The porosity, the compressive strength and the yield of the fired product are shown in the Table 3.

It is noted from Table 3 that preferable amount of fluid oil coke is 10% by weight or more, but less than 60 weight %. The amount below 10 weight % results in insufficient porosity whereas the amount in excess of 60 weight % makes it difficult to produce excellent magnesia refractory of high porosity.

TABLE 3

| fluid oil coke amount of admixture (%) | calcination temperature (°C.) | properties of fired product (clinker) | | |
|---|---|---|---|---|
| | | porosity (%) | compressive strength (kg/cm$^2$) | yield (%) |
| 5 | 1400 | 8 | 1650 | 96 |
| 10 | 1400 | 16 | 1280 | 96 |
| 30 | 1400 | 39 | 700 | 94 |
| 60 | 1400 | 68 | 180 | 75 |
| 70 | 1400 | collapsed | collapsed | — |

It is preferable that the grain size of the magnesia material is less than 0.1 mm.

If the grain size of the magnesia material is as large as 0.1 mm or more, sintering becomes difficult to produce clinkers which are high in calcined product strength as well as in clinker strength. Although the fluid oil coke of the grain size of 3 mm or less is acceptable, that of 1 mm or less is more preferable. If the fluid oil coke having the grain size of 1 mm or less is used, the diameter of produced pores is small, the distribution thereof becomes uniform, the heat insulation is excellent, and the clinker strength is high. If the fluid oil coke having the grain size of 3 mm or higher is used, the diameter of produced pore is large, the distribution of thereof becomes extremely ununiform, the clinker structure is uneven and the clinker strength low.

In forming the mixture of magnesia material and fluid oil coke, either dry or wet method generally used may be employed. The formed products of the mixture of the magnesia material and fluid oil coke is calcined at the next step. Calcination temperature of 900° C. or higher but lower than 1,600° C. is preferable. Calcination at less than 900° C. results in smaller strength of calcined product and thus likely to cause much loss due to the damage during calcination step. The surface of the calcined products rapidly becomes sintered at the temperature of 1,600° C. or more and that causes difficulties in burning of coke inside to thereby leave coke after burning step. Calcination is carried out in a shaft kiln or a band dryer type kiln of conventional type. Calcination temperature can be adjusted by the amount of airflow or the volume of the formed products which are piled. The above effect of the calcination temperature is shown in Experimental Example 3.

EXPERIMENTAL EXAMPLE 3

The formed products added with the fluid oil coke used in Experimental Example 2 in the ratio of 30 weight % were dried and charged into the calcination kiln used in Experimental Example 1 for calcining at temperatures shown in Table 4. The calcined products were then fired at 1,900° C. in a rotary kiln. The conditions of calcined and fired products are shown in Table 4.

TABLE 4

| fluid oil coke amount of admixture (%) | calcination | | fired product (clinker) | |
|---|---|---|---|---|
| | temperature (°C.) | condition of calcined product | condition of fired product | yield (%) |
| 30 | 900 | inferior | small sized grains predominate | 47 |
| 30 | 1200 | good | good | 88 |
| 30 | 1500 | good | good | 95 |
| 30 | 1600 | poor (surface | good | 95 |

TABLE 4-continued

| fluid oil coke amount of admixture (%) | calcination temperature (°C.) | condition of calcined product | fired product (clinker) condition of fired product | yield (%) |
|---|---|---|---|---|
| 30 | 1700 | sintered) surface excessively sintered | poor (coke remained) | — |
| 30 | not calcined | | poor (cokes remained) | — |

From Table 4, it is understood that the calcination temperature of 900° C. or higher but below 1,600° C. is preferable to burn out fluid oil coke which have been added to the raw material. Low calcination temperature results in lower strength of the calcined products and less yield of the product. Excessive calcination temperature results in sintering the surface of the calcined products and thus makes it difficult to burn out the coke. Remaining coke will not become burned out even if they are fired in a rotary kiln at 1,900° C.

Uncalcined formed products were directly fired in the rotary kiln for comparison, and the gas temperature in the inlet of the kiln became remarkably high, causing operational difficulties. A large amount of cokes remained in the burned products.

As described in the above, the manufacturing method according to the present invention produces magnesia clinker with uniform distribution of pores, high porosity and high strength easily and inexpensively.

Preferred examples of the present invention are now described.

EXAMPLE 1

Fluid oil coke of the grain size of 1 mm or less was added to calcined magnesia (the same as that used in Experimental Example 1) by 35 weight % and formed into the briquets of 20×25×25 mm size by a briquet machine. The resulting briquets were piled in a band dryer (volume 5 m$^3$, height 35 cm). They were calcined at the temperature of 1,300° to 1,500° C. for 48 hours producing no damages in the products and leaving no coke residues.

The calcined product was then charged into a rotary kiln and fired at 1,850° C. to produce a magnesia clinker 43% porosity and 610 kg/cm$^2$ compressive strength. And the yeild of the magnesia clinker was 93%.

EXAMPLE 2

Magnesite (MgO 45.7%, SiO$_2$ 1.7%, CaO 1.0%, Fe$_2$O$_3$ 0.3%, Al$_2$O$_3$ 1.3%, Ig. loss 50.0%) was pulverized to the grain size of 8.5% residue on the 88$\mu$ sieve, added and mixed with fluid oil coke of the grain size of 1 mm or less (ash content 1.3%) at the ratio of 15%. The resultant mixture was formed into pellets of 20 mm or less by a panpelletizer, and left to naturally dry. The dried pellets were filled in a shaft kiln (4 m$^3$) and ignited by propane gas at 1,100°-1,300° C. in the kiln. The coke was completely burned out after 24 hours without producing any damages in the calcined product.

The calcined products were then charged into a rotary kiln and fired at 1,900° C. to obtain magnesia clinker having the porosity of 21% and the compressive strength of 1,150 kg/cm$^2$. And the yield was 89%.

EXAMPLE 3

Magnesia clinker (MgO 98.5%, CaO 1.0%, SiO$_2$ 0.25%, Fe$_2$O$_3$ 0.1%, Al$_2$O$_3$ 0.1%) was pulverized to the grain size of 1.5% residue on the 44$\mu$ sieve to which fluid oil coke of 1 mm or less in size was added at the weight ratio of 50%, and mixed. Methylcellulose in the weight ratio of 0.3% was further added. The resulting mixture was formed with 10% of water by a briquet machine to the size of 20×25×25 mm (shaped like almond) and left to dry. The formed and dried grains were charged into a shaft kiln (4 cm$^3$) and calcined at the temperature of 1,400° to 1,600° C. for 24 hours. There was neither damage nor coke residue in the calcined product. When the calcined products were further fired in a rotary kiln at 2,030° C., magnesia clinker having the porosity of 59% and the compressive strength of 210 kg/cm$^2$ was obtained. And the yield was 95%.

We claim:

1. A method for producing a porous magnesia clinker comprising the steps of
    (a) admixing a magnesia material having a grain size of less than about 0.1 mm with from about 10 to 60 percent by weight of the mixture of fluid oil coke having a grain size of about 1 mm or less;
    (b) calcining the resulting mixture at a temperature of from about 900° C. to 1,600° C. for a time sufficient to burn off said coke and thereby to form pores in said magnesia material, and
    (c) firing the resulting product at a temperature of from about 1600° C. to 2,030° C. to produce porous magnesia clinker.

2. A method according to claim 1, wherein said magnesia material is selected from the group consisting of calcined magnesia, magnesite, magnesium hydroxide, and mixtures thereof.

* * * * *